(12) United States Patent
Croft et al.

(10) Patent No.: US 8,982,414 B2
(45) Date of Patent: Mar. 17, 2015

(54) METHOD AND APPARATUS FOR AUTOMATICALLY UPDATING A PROSE ATTRIBUTE ENTRY BASED UPON PRINT JOB PARAMETERS OF A PRINT JOB ORDER

(71) Applicant: Xerox Corporation, Norwalk, CT (US)

(72) Inventors: Jason R. Croft, West Henrietta, NY (US); Charles R. Myers, III, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/837,280

(22) Filed: Mar. 15, 2013

(65) Prior Publication Data

US 2014/0268192 A1  Sep. 18, 2014

(51) Int. Cl.
G06F 15/00 (2006.01)
G06K 1/00 (2006.01)
G06K 15/02 (2006.01)

(52) U.S. Cl.
CPC .................................. *G06K 15/1802* (2013.01)
USPC ........................................................ 358/1.9

(58) Field of Classification Search
None
See application file for complete search history.

(56) References Cited

U.S. PATENT DOCUMENTS

| 6,148,164 | A | * | 11/2000 | Shima | 399/82 |
| 7,339,686 | B1 | * | 3/2008 | Ward et al. | 358/1.13 |
| 8,687,208 | B2 | * | 4/2014 | Nakatsuka | 358/1.13 |
| 2007/0097448 | A1 | * | 5/2007 | Iizuka | 358/403 |
| 2008/0144080 | A1 | * | 6/2008 | Randt | 358/1.15 |

* cited by examiner

*Primary Examiner* — Vincent Rudolph
*Assistant Examiner* — Michael Burleson (57) ABSTRACT

A method, non-transitory computer readable medium, and apparatus for updating a prose attribute entry based upon one or more print job parameters of a print job order are disclosed. For example, the method detects a mismatch between the one or more print job parameters of the print job order and a prose attribute field of a print job request, presents an option to update the prose attribute entry in the prose attribute field corresponding to the one or more print job parameters of the print job order that are mismatched, receives a confirmation to update the prose attribute entry in the prose attribute field and updates the prose attribute entry to include the one or more print job parameters that were mismatched.

18 Claims, 5 Drawing Sheets

FIG. 1

Description:

All fields marked * are required.
Job ID NA

Job Name*
[New Account Flyer] — 202

Category*
[Comm. Print ▼]
204

Subcategory*
[Flyer ▼]
206

Description*
Example: Rack Brochure for XYZ campaign.
[10K A4 2pp printed 4
col process + PMS 3272
green plus overall
sealer varnish both
sides. Trimmed to size
& packed to suit for]
208

Customer Name*
[Client1 ▼]
210

Customer Department
[Marketing]
212

Budget Line/Cost Center
[ ]

Bid Due On *
[25 ▼] [March ▼] [2012 ▼]
[5 ▼]:[00 ▼] [PM ▼]
214

Order/Delivery Due On *
[1 ▼] [April ▼] [2012 ▼]
[5 ▼]:[00 ▼] [PM ▼]
216

Artwork Due Date
[ ▼] [ ▼] [ ▼]
[5 ▼]:[00 ▼] [PM ▼]

Special Instructions
Example: Please call when proofs are complete.
[ ]
218

Samples Requested
[ ]

Component
- Name: Flyer
- Quantity: 10000
- No. of Pages: 2
- Finished Size: A4 — Finished Width: 210 mm — Finished height: 210 mm
- Flat Size: A4 — Flat Width: 210 mm — Flat Height: 210 mm

Versions
- Version Number: 1
- Version Name: Default
- Quantity 1: 10000
- Additional Plates: 0
- Colour Washes: 0
- TOTAL: 0

Press
- Paper:
  - ● Standard — Weight: 130 GSM
  - ○ Other — Weight: 130 GSM, gsm
- Description:
- Grade: #1
- Cost/100 Kg:
- Finish: Coated Silk
- Coated: ☐

Colours

| | 4-Colour Coverage | No. of Black | Coverage | No. of PMS | Coverage | No. of Metallic | Coverage | Varnish | Total | Aqueous Coating |
|---|---|---|---|---|---|---|---|---|---|---|
| Front ☑ | Medium | 0 | None | 1 | Spot | 0 | None | Flood | 6 | None |
| Back ☑ | Medium | 0 | None | 1 | Spot | 0 | None | Flood | 6 | None |
| Common ☑ | | | | | | | | | 6 | |
| Bleed ☑ | PMS Colours: PMS 3272 | | | | | | | | | |

302 — Component
304 — Versions
306 — Press
308 — Colours

METHOD AND APPARATUS FOR AUTOMATICALLY UPDATING A PROSE ATTRIBUTE ENTRY BASED UPON PRINT JOB PARAMETERS OF A PRINT JOB ORDER

The present disclosure relates generally to automated data entry and, more particularly, to a method and an apparatus for automatically entering a prose attribute entry based upon print job parameters of a print job order.

BACKGROUND

Many customers may need to have various print jobs fulfilled for their businesses. Typically, the customer may fill out a job request in order for suppliers to bid on his or her print job requests.

Alternatively, a third party may receive the job request from the customer and manually fill out a print order form based upon the job request. The print order form may be used to estimate pricing based upon contracted rates from a number of suppliers. The suppliers may then use the estimated pricing to submit bids on the print job request.

Sometimes the print job requests may not match the actual print job order that is submitted for one reason or another. For example, a last second change may be made manually to the print job order that was not in the print job request or the print job request may had a typographical error or jargon that had to be entered manually into the print job order.

SUMMARY

According to aspects illustrated herein, there are provided a method, a non-transitory computer readable medium and an apparatus for updating a prose attribute entry based upon one or more print job parameters of a print job order. One disclosed feature of the embodiments is a method that detects a mismatch between the one or more print job parameters of the print job order and a prose attribute field of a print job request, presents an option to update the prose attribute entry in the prose attribute field corresponding to the one or more print job parameters of the print job order that are mismatched, receives a confirmation to update the prose attribute entry in the prose attribute field and updates the prose attribute entry to include the one or more print job parameters that were mismatched.

Another disclosed feature of the embodiments is a non-transitory computer-readable medium having stored thereon a plurality of instructions, the plurality of instructions including instructions which, when executed by a processor, cause the processor to perform a method that detects a mismatch between the one or more print job parameters of the print job order and a prose attribute field of a print job request, presents an option to update the prose attribute entry in the prose attribute field corresponding to the one or more print job parameters of the print job order that are mismatched, receives a confirmation to update the prose attribute entry in the prose attribute field and updates the prose attribute entry to include the one or more print job parameters that were mismatched.

Another disclosed feature of the embodiments is an apparatus comprising a processor that is configured to detect a mismatch between the one or more print job parameters of the print job order and a prose attribute field of a print job request, present an option to update the prose attribute entry in the prose attribute field corresponding to the one or more print job parameters of the print job order that are mismatched, receive a confirmation to update the prose attribute entry in the prose attribute field and update the prose attribute entry to include the one or more print job parameters that were mismatched.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and non-transitory computer readable medium for updating a prose attribute entry based upon one or more print job parameters of a print job order. As discussed above, sometimes print job requests may not match the actual print job order that is submitted for one reason or another. For example, one more print job parameters entered in one or more fields of the print job order may not match print job parameters obtained from one or more prose attribute entries in a prose attribute field.

One embodiment of the present disclosure may automatically detect any mismatch that occurs and update the prose attribute entries in the prose attribute field to match the print job parameters of the print job order. As a result, the print job parameters in the prose attribute field and the print job order will be consistent.

Figure 1:
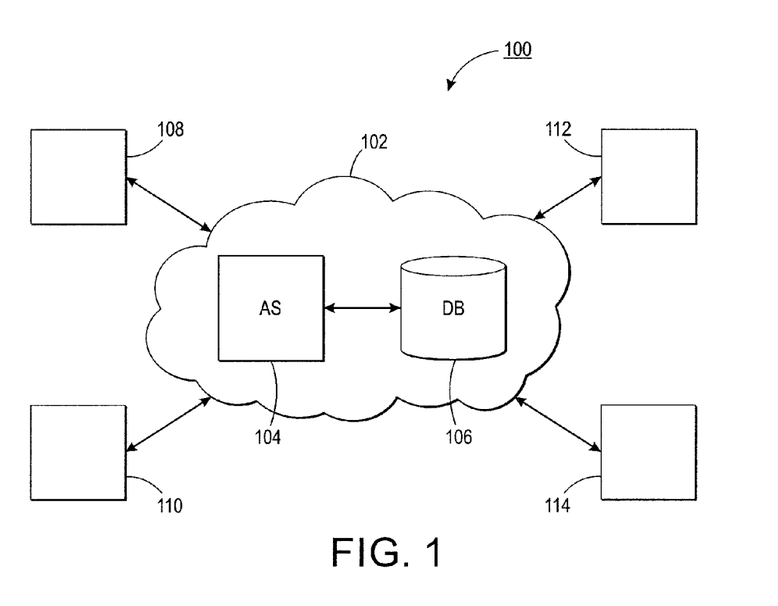
FIG. 1 illustrates one example of a communication network of the present disclosure.

To better understand the present disclosure, FIG. 1 illustrates an example of a communication network 100. In one embodiment, the communication network 100 includes a packet network such as an Internet Protocol (IP) network 102. The IP network 102 may be, for example, the Internet, a service provider network, an access network, a core network, a local area network, and the like.

In one embodiment, the IP network 102 may include an application server (AS) 104 and a database (DB) 106. In one embodiment, the AS 104 may host a web application for presenting forms for customers to enter print job requests and preparing print job orders for suppliers. In one embodiment, the AS 104 may be, for example, a MarketPort® application for calculating an estimated cost to produce a print job as part of a reverse auction workflow.

In one embodiment, the DB 106 may store various information associated with the customers, suppliers and the web application. For example, the DB 106 may store contact information for customers, contact information for suppliers, current bids from suppliers, estimated costs for print job requests, completed print job request forms, completed print job order forms, form templates, and the like.

Although the AS 104 and the DB 106 are illustrated as being in the IP network 102, it should be noted that the AS 104 and DB 106 could be located at a third party location outside of the IP network 102. For example, the AS 104 and DB 106 may be at an enterprise location that is in communication with the IP network 102.

In one embodiment, one or more customers may access the web application hosted by the AS 104 via one or more endpoint devices 108 and 110. The one or more endpoint devices 108 and 110 may be any type of endpoint device capable of communicating with the IP network 102 and having a user interface to interact with the web application. For example, the one or more endpoint devices 108 and 110 may include a desktop computer, a laptop computer, a tablet device, a smart phone, a personal digital assistant, a netbook and the like. Although only two customer endpoint devices are illustrated in FIG. 1 it should be noted that any number of customer endpoint devices may be deployed.

Figure 2:
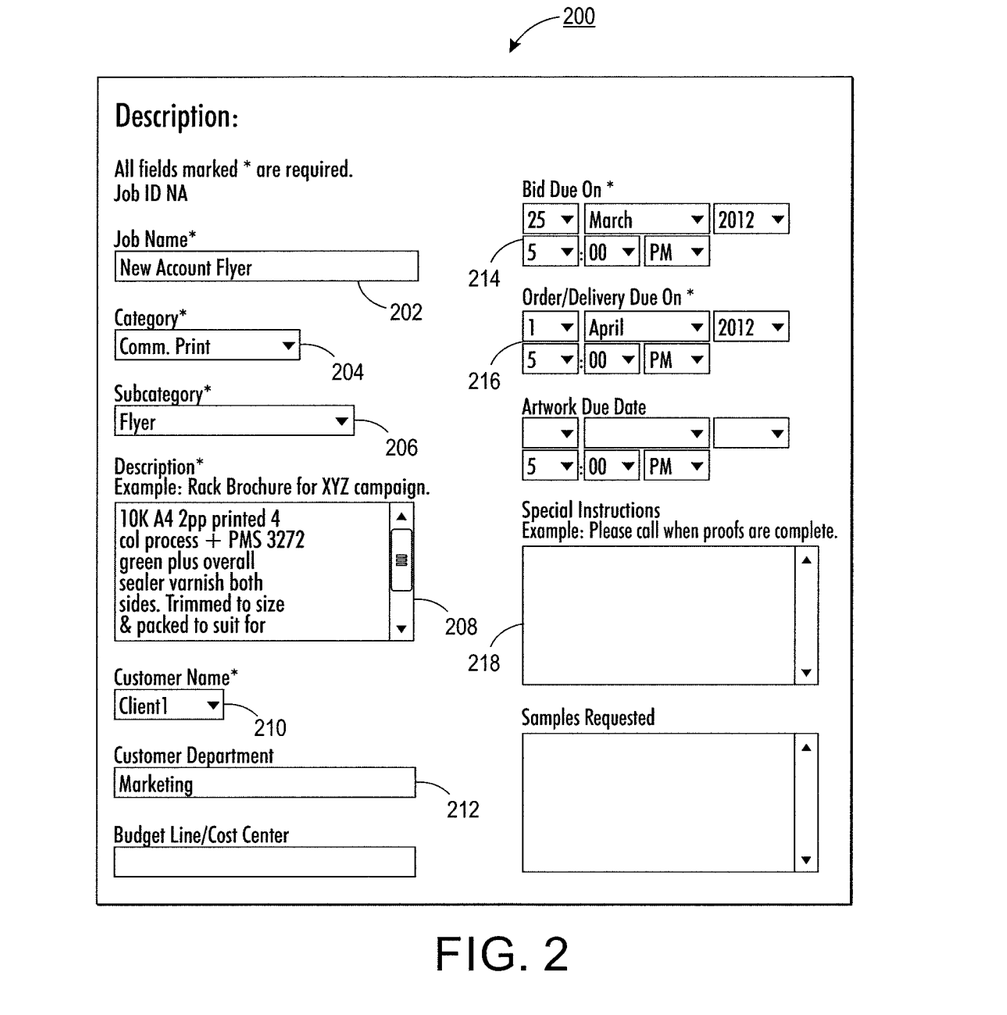
FIG. 2 illustrates an example of a print job request.

In one embodiment, the customer may enter print job requests via his or her respective endpoint device. For example, the customer may access a web application and be presented with a print job request form to enter a print job request. An example of the print job request form 200 is illustrated in FIG. 2. The print job request form 200 may include various fields for the customer to enter information. The fields may be either text entry or drop down menus.

The fields may include, for example, a job name field 202, a category field 204, a subcategory field 206, a prose attribute field 208 (also referred to as a description field), a customer name field 210, a customer department field 212, a bid due date field 214, an order due date field 216, a special instruction field 218, and the like. The above fields are listed as examples only and the print job request form 200 may include more fields or less fields.

In one embodiment, a natural language processor (e.g., a neural network) may be used to analyze the prose attribute field 208 and identify one or more print job parameters from the prose entered in the prose attribute field 208. In another embodiment, a pre-defined dictionary of print job terms may be used to try and identify text in a particular form that matches a form of known abbreviations stored in the pre-defined dictionary.

For example, the prose attribute field 208 may include the following prose "10K A4 2 pp printed 4 col process+PMS 3272 green plus overall sealer varnish both sides. Trimmed to size & packed to suit for delivery. On Regency Silk 130 gsm." The abbreviation "10K" may be identified as a quantity parameter of 10,000. The abbreviation "A4" may be identified as a paper size parameter of ISO A4 (210 millimeter (mm)×297 mm). The abbreviation "2 pp" may be a page count parameter of 2 pages. The abbreviation "4 col process+PMS 3272 green plus overall sealer varnish both sides" may be a color parameter requesting a 4 color process of cyan, magenta, yellow and key (CYMK) and Pantone PMS 3272 with 1 flood varnish on both the front and back. The prose "on Regency Silk" may be a paper finish parameter requesting a coated silk paper finish. The abbreviation "130 gsm" may be a paper weight parameter requesting paper that has a grammage of 130 grams per square meter.

The above abbreviations and forms of text found in the prose attribute field 208 are only listed as examples. It should be noted that other abbreviations and forms of text may be available and may vary from region to region. In addition, the pre-defined dictionary may be trained based upon the region in which the pre-defined dictionary is located.

In one embodiment, the prose attribute field 208 may have a pre-defined order of prose or attributes such that the job parameters may be easily identified. For example, the pre-defined order may require the customer to enter prose or abbreviations in the order of quantity, paper size, total pages, color specifications, finish and paper weight. This would help speed up the processing required by the natural language processor or pre-defined dictionary to identify the job parameters in the prose attribute field 208.

In one embodiment, if text of a particular form is unknown or no match is found in the pre-defined dictionary, the customer may be prompted to provide a definition for the text or prose. For example, the web application may provide a pop-up window to have the customer define the text (i.e., broadly providing a definition for the text) that is unknown or that has no match in the pre-defined dictionary. The pre-defined dictionary may then be updated with the newly defined abbreviation or form of text (i.e., broadly updating the pre-defined dictionary with the text and the associated definition provided by the user).

In one embodiment, the print job parameters identified from the analyzed prose attribute field 208 may optionally be translated into an extensible markup language (XML) format. Placing the print job parameters in a system independent format allows the print job parameters to be stored and used as inputs for other computerized systems such as job ticketing, job estimation, print procurement and the like.

In one embodiment, a location or corresponding prose attribute entry of each print job parameter that is extracted from the prose attribute field 208 may be stored in memory. For example, the first abbreviation in the prose attribute field 208 may be stored as being the quantity parameter, the second abbreviation in the prose attribute field 208 may be stored as being the paper size parameter, and so forth. This information can be used to easily update the proper parameter in the prose attribute field 208 if a mismatch is detected, as will be discussed below.

In one embodiment, one or more suppliers may access the web application hosted by the AS 104 via one or more endpoint devices 112 and 114. The one or more endpoint devices 112 and 114 may be any type of endpoint device capable of communicating with the IP network 102 and having a user interface to interact with the web application. For example, the one or more endpoint devices 112 and 114 may include a desktop computer, a laptop computer, a tablet device, a smart phone, a personal digital assistant, a netbook and the like. Although only two supplier endpoint devices are illustrated in FIG. 1 it should be noted that any number of supplier endpoint devices may be deployed.

In one embodiment, one or more suppliers may bid on print job orders via their respective endpoint devices. For example, a supplier may access a web application and view print job orders that include specifications for the print job.

In one embodiment of the present disclosure, one or more print job parameters in the print job order may be automatically populated based upon one or more print job parameters that are identified in the prose attribute field 208 of the print job request form 200.

Figure 3:
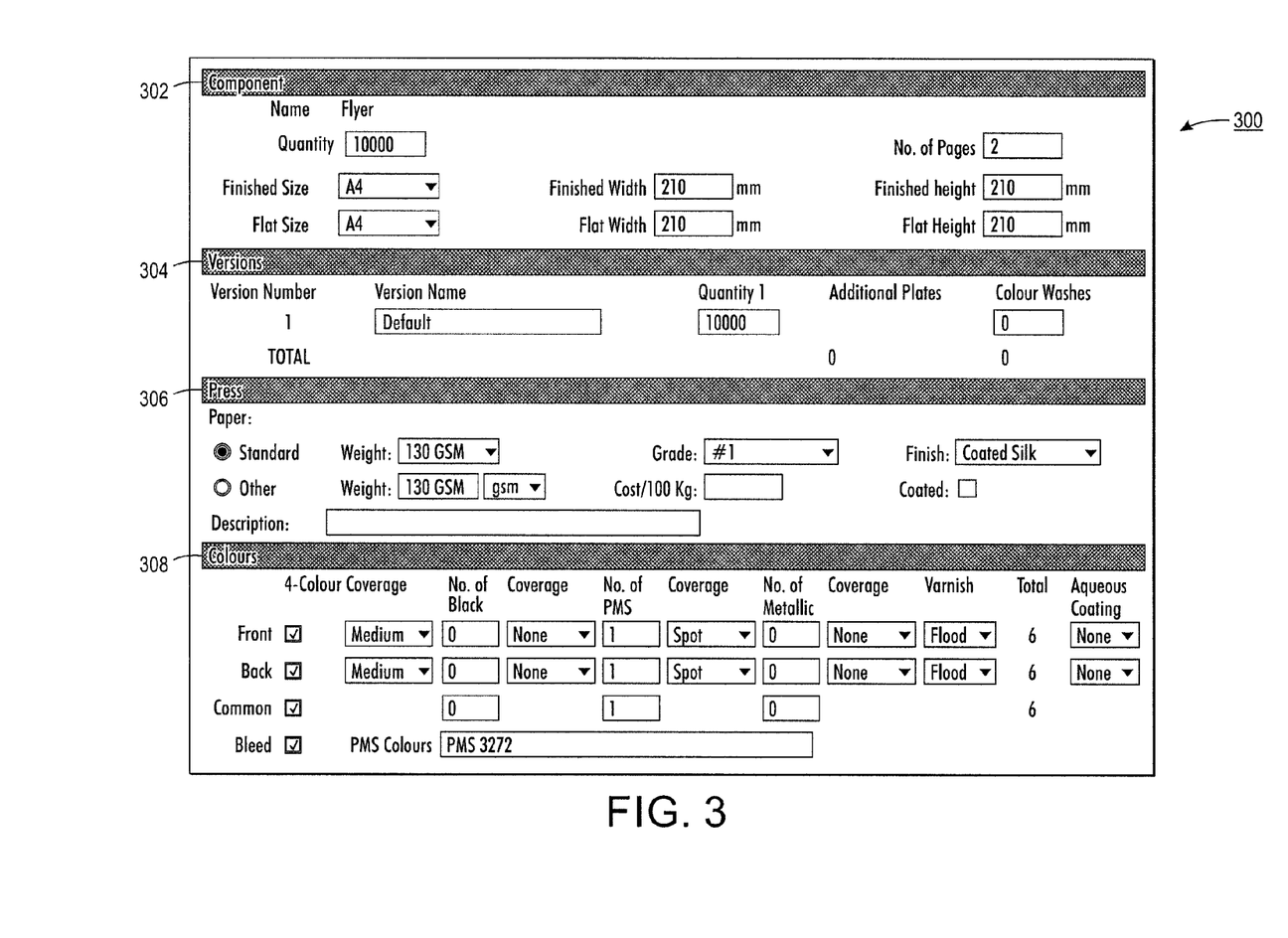
FIG. 3 illustrates an example of a print job order.

One example of a print job order form 300 is illustrated in FIG. 3. The print job order form 300 may include various sections, such as for example, a component section 302, a versions section 304, a press section 306 and a colors section 308. Each one of the sections may include one or more fields for a specific print job parameter. The sections and fields illustrated in FIG. 3 are only examples and it should be noted that more sections or fields or less sections or fields may be included.

As noted above, one or more print job parameters may be identified from the prose attribute field 208 of the print job request form 200. The one or more print job parameters may then be used to populate one or more fields in the print job order form 300. For example, using the above example prose of "10K A4 2 pp printed 4 col process+PMS 3272 green plus overall sealer varnish both sides. Trimmed to size & packed to suit for delivery. On Regency Silk 130 gsm" various fields can be automatically populated in the print job order form 300.

The AS 104 may identify one or more fields in the print job order form 300 that correspond to a respective one of the one or more identified print job parameters, and then populate the one or more fields with the appropriate values or inputs. FIG. 3 illustrates that the quantity field, the finished size and number of pages in the component section 302, the paper weight field, the grade field and the finish field in the press section 306 and the front and back color (or colour) fields in the color (or colour) section 308 have been automatically populated.

However, some of the print job parameters in the one or more fields of the print job order form 300 can be changed. For example, a document advisor may manually change the quantity parameter from 10,000 to 20,000, thereby, overriding the automatic entry based upon the prose attribute field 208. As a result, a mismatch may occur between one or more print job parameters in the print job order form 300 and the corresponding print job parameters in the prose attribute field 208. One embodiment of the present disclosure may automatically detect this mismatch and update the prose attribute entry in the prose attribute field 208 corresponding to the mismatched print job parameter. Using the above example, one embodiment of the present disclosure would change the prose attribute entry "10K" in the prose attribute field 208 to "20K" based upon the detected mismatch of the quantity parameter.

In one embodiment, the prose attribute field 208 may be updated to add new prose attribute entries based upon print job parameters in the print job order form 300 that were not included in the prose attribute field 208 of the original print job request form 200. For example, if the print job order form 300 includes specific paper grade that was not in the prose attribute field 208, the present disclosure may add a prose entry to the prose attribute field 208 to include the specific paper grade. Alternatively, if important comments are included in the print job order form 300, the comments can be added as new prose entries in the prose attribute field 208 when performing the update.

It should be noted that the network 100 has been simplified for clarity. For example, the network 100 may include other network elements such as border elements, routers, switches, policy servers, security devices, firewalls, a content distribution network (CDN) and the like. In addition, the network 100 may include additional networks between the endpoint devices and the IP network 102 such as different access networks (e.g., a wired access network, a cable network, a wireless network, a cellular network, a Wi-Fi network, and the like) to reach the IP network 102.

Figure 4:
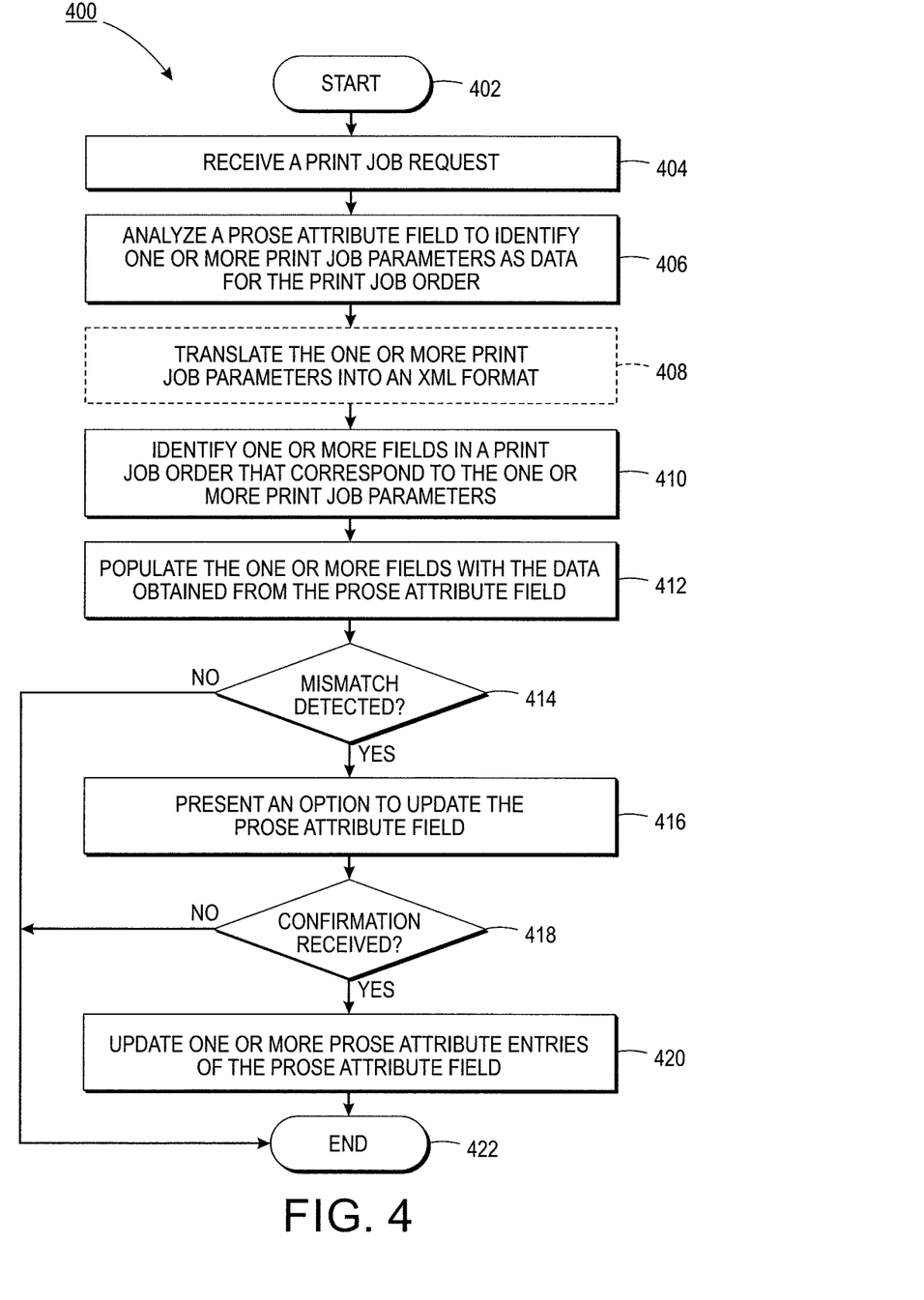
FIG. 4 illustrates an example flowchart of one embodiment of a method for updating a prose attribute entry based upon one or more print job parameters of a print job order.
Figure 5:
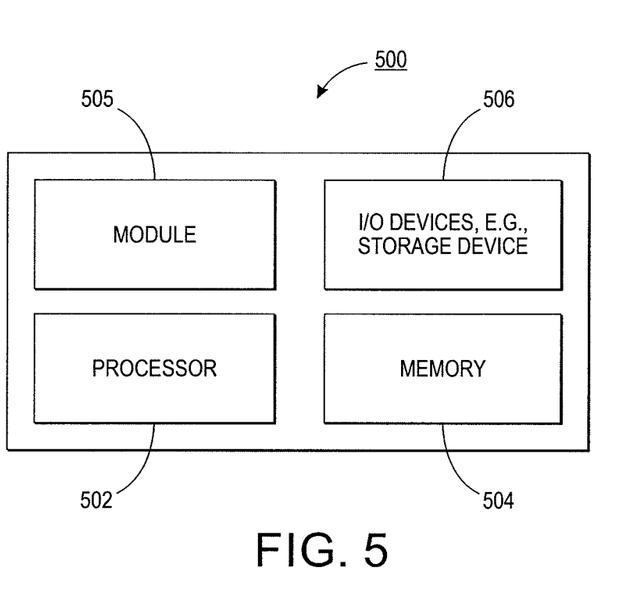
FIG. 5 illustrates a high-level block diagram of a general-purpose computer suitable for use in performing the functions described herein.

FIG. 4 illustrates a flowchart of a method 400 for updating a prose attribute entry based upon one or more print job parameters of a print job order. In one embodiment, the method 400 may be performed by the AS 104 or a general-purpose computer as illustrated in FIG. 5 and discussed below.

The method 400 begins at step 402. At step 404, the method 400 receives a print job request. In one embodiment, the print job request may include a prose attribute field that includes a prose attribute. For example, the AS 104 may host a web application that provides an interface to a customer to generate a print job request. In one embodiment, the customer may enter data into the print job request form 200 via the web application.

At step 406, the method 400 analyzes the prose attribute to identify one or more print job parameters as data for the print job order. For example, the prose attribute field 208 may include the following prose "10K A4 2 pp printed 4 col process+PMS 3272 green plus overall sealer varnish both sides. Trimmed to size & packed to suit for delivery. On Regency Silk 130 gsm." The AS 104 may analyze the prose attribute to look for specific forms in the text or certain abbreviations. In one embodiment, the AS 104 may use a natural language processor or a pre-defined dictionary to perform the analysis to identify a particular form of the text or certain abbreviations that provide information about specific print job parameters.

In another embodiment, a pre-defined dictionary of print job terms may be used. For example, a matching function may be employed where the AS 104 may try to match the text in the prose attribute field of the print job request with one of the print job terms in the pre-defined dictionary. For example, "#K" may represent a quantity value. Thus, the form of a number followed by the letter K may be a standard way of abbreviating the value in units of thousands for a quantity parameter. Thus, the abbreviation "10K" in the example above may be matched to the form "#K" in the pre-defined dictionary and be identified as a print job parameter of quantity equaling 10,000 copies.

In one embodiment, a location or corresponding prose attribute entry of each print job parameter that is extracted from the prose attribute field 208 may be stored in memory. For example, when the first abbreviation "10K" in the prose attribute field 208 is identified as being quantity parameter, the first abbreviation may be stored as being the quantity parameter. Similarly, the second abbreviation "A4" in the prose attribute field 208 may be stored as being the paper size parameter, and so forth. This information can be used to easily update the proper print job parameter in the prose attribute field 208 if a mismatch is detected, as will be discussed below.

The method 400 may then perform optional step 408. At optional step 408, the method 400 translates the one or more print job parameters into an XML format. The XML format is a system-independent format that allows the identified one or more print job parameters to be used as inputs for other computerized systems. For example, the one or more job parameters may be used as inputs for a job ticketing system, a job estimation system, a print procurement system, and the like.

At step 410, the method 400 identifies one or more fields in a print job order that correspond to the one or more print job parameters. For example, once the one or more print job parameters are identified, the appropriate fields in the print job order form associated with each one of the one or more print job parameters may also be identified. As a result, the data associated with each one of the one or more print job parameters may be correctly inputted into the print job order form.

At step 412, the method 400 populates the one or more fields with the data obtained from the prose attribute. For example, the job parameter of quantity=10,000 may be obtained from the prose attribute "10K" in the example above. Thus, the quantity field in the print job order form may be automatically inputted with the value of 10,000 that was obtained from the prose attribute of "10K", as illustrated by example in FIG. 3.

At step 414, the method 400 determines if a mismatch is detected. For example, some of the print job parameters in the one or more fields of the print job order form can be changed. For example, a document advisor may manually change the quantity field from 10,000 to 20,000, thereby, overriding the automatic entry based upon the prose attribute field in step 412. As a result, a mismatch may occur between one or more print job parameters in the print job order and the corresponding print job parameters in the prose attribute field of the print job request.

In one embodiment, the detection may include a detection of any change to one or more print job parameters in the print job order. For example, if any value in one or more fields of the print job order are changed, the method 400 may detect a change to one or more print job parameters in the print order.

After the change is detected, a comparison may be performed between the one or more print job parameters that changed in the print job order to a corresponding prose attribute entry in the prose attribute field of the print job request. If the one or more print job parameters that changed in the print job order are different from a print job parameter associated with the corresponding prose attribute entry, then a mismatch is detected.

In one embodiment, the comparison may be performed immediately after the print job order is created. In another embodiment, the comparison may be performed upon detection of a change to the print job order, as discussed above. In yet another embodiment, the comparison may be performed periodically, e.g., once every hour, once every day, once every month, and the like.

In one embodiment, the comparison may only compare the print job parameters in the print job order that were extracted from the prose attribute field (e.g., from step 406). In other words, there may be a one to one correlation of print job parameters to prose attribute entries in the prose attribute field. In another embodiment, the comparison may compare all of the print job parameters such that any print job parameters that are not included in the prose attribute field may be added. In other words, there may not necessarily be a one to one mapping of the print job parameters to prose attribute entries in the prose attribute field.

At step 414 if a mismatch is not detected, the method 400 may proceed to step 422. At step 414 if a mismatch is detected, the method 400 may proceed to step 416.

At step 416, the method 400 may present an option to update the prose attribute field. In one embodiment, the option may be to update the prose attribute entry in the prose attribute field corresponding to the one or more print job parameters in the one or more fields of the print job order that are mismatched. The option may be presented to the user in a graphical display of an endpoint device used to submit the print job request or a graphical display of a multi-function device that will perform the print job order.

At step 418, the method 400 determines if a confirmation is received. For example, a user may simply select a proceed button on the graphical display. If a confirmation is not received at step 418, the method 400 proceeds to step 422. If a confirmation is received at step 418, the method 400 may proceed to step 420.

At step 420, the method 400 updates one or more prose attribute entries of the prose attribute field. For example, the prose attribute field is updated such that one or more prose attribute entries include the one or more print job parameters that were mismatched. Using the example above in the step 414, the prose attribute entry "10K" may be updated to recite "20K".

In one embodiment, a prose attribute entry corresponding to the print job parameter may be found in the pre-defined dictionary of print job terms. For example, the print job parameter that has changed may be matched to a corresponding print job parameter in the pre-defined dictionary and an associated prose attribute entry in the pre-defined dictionary.

To illustrate, if the print job parameter that changed was a quantity parameter, the method 400 would find the quantity parameter entry in the pre-defined dictionary and the associated prose attribute entry of "(#/1000)K". Said another way, in the present example, the quantity parameter may be expressed in thousands by the abbreviation "#K". As a result, if the quantity were changed from 10,000 to 20,000 the prose attribute entry found in the pre-defined dictionary would be "20K" (i.e., 20,000/1,000=20K). As can be seen by the example, in one embodiment, the prose attribute entry may include a function or equation to manipulate a value to the appropriate abbreviation for the prose attribute entry.

In one embodiment, the update may be efficiently processed due to the fact that the location of each print job parameter within the prose attribute field was stored in memory in step 406, as discussed above. For example, the entire prose attribute field does not need to be analyzed again to identify each prose attribute entry and determine which print job parameter the prose attribute entry corresponds to. Rather, since this information was already analyzed in the step 406 above, the method 400 may know exactly which prose attribute entry in the prose attribute field corresponds to a quantity parameter and update the prose attribute entry accordingly.

In one embodiment, updating may include adding new prose attribute entries. For example, if a new print job parameter is found in the print job order that was not included in the prose attribute field of the original print job request, then a new prose attribute entry may be added for the new print job parameter. In one embodiment, if no corresponding prose attribute entry is found in the pre-defined dictionary, the user may be prompted to enter a prose attribute entry for the new print job parameter. In one embodiment, the new prose attribute entries may also include comments in the print job order that were not in the print job attribute field. The method ends at step 422.

It should be noted that although not explicitly specified, one or more steps, functions, or operations of the method 400 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIG. 4 that recite a determining operation, or involve a decision, do not necessarily require that both branches of the determining operation be practiced. In other words, one of the branches of the determining operation can be deemed as an optional step.

FIG. 5 depicts a high-level block diagram of a general-purpose computer suitable for use in performing the functions described herein. As depicted in FIG. 5, the system 500 comprises a processor element 502 (e.g., a CPU), a memory 504, e.g., random access memory (RAM) and/or read only memory (ROM), a module 505 for updating a prose attribute entry based upon one or more print job parameters of a print job order, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents, e.g., computer readable instructions pertaining to the method(s) discussed above can be used to configure a hardware processor to perform the steps of the above disclosed methods. In one embodiment, the present module or process 505 for updating a prose attribute entry based upon one or more print job parameters of a print job order can be loaded into memory 504 and executed by processor 502 to implement the functions as discussed above. As such, the present method 505 for updating a prose attribute entry based upon one or more print job parameters of a print job order (including associated data structures) of the present disclosure can be stored on a non-transitory (e.g., physical and tangible) computer readable storage medium, e.g., RAM memory, magnetic or optical drive or diskette and the like. For example, the hardware processor 502 can be programmed or configured with instructions (e.g., computer readable instructions) to perform the steps, functions, or operations of method 400.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for updating a prose attribute entry based upon one or more print job parameters of a print job order, comprising:
   detecting, by a processor, a mismatch between the one or more print job parameters of the print job order and a prose attribute field of a print job request, wherein the mismatch is caused by a manual change to one of the one or more print job parameters of the print job order that was automatically populated from the prose attribute entry in the prose attribute field;
   presenting, by the processor, an option to update the prose attribute entry in the prose attribute field corresponding to the one or more print job parameters of the print job order that are mismatched;
   receiving, by the processor, a confirmation to update the prose attribute entry in the prose attribute field; and
   updating, by the processor, the prose attribute entry to include the one or more print job parameters that were mismatched, wherein the updating comprises identifying the prose attribute entry from a pre-defined dictionary of print job terms.

2. The method of claim 1, wherein the detecting comprises:
   detecting, by the processor, a change to the one or more print job parameters of the print job order;
   comparing, by the processor, the change to the one or more print job parameters of the print job order to a corresponding prose attribute entry in the prose attribute field of print job request; and
   detecting, by the processor, the mismatch if the change to the one or more print job parameters of the print job order and a print job parameter associated with the corresponding prose attribute entry are different.

3. The method of claim 1, further comprising:
   identifying, by the processor, from the print job request the one or more print job parameters in the prose attribute field; and
   storing, by the processor, the prose attribute entry that corresponds to each one of the one or more print job parameters and a location of the prose attribute entry in the prose attribute field.

4. The method of claim 1, wherein the updating further comprises adding a new prose attribute entry.

5. The method of claim 1, wherein the identifying comprises matching the one or more print job parameters that are mismatched to a corresponding print job parameter in the pre-defined dictionary and an associated prose attribute entry in the pre-defined dictionary.

6. The method of claim 1, further comprising:
   prompting, by the processor, a user to provide the prose attribute entry for the one or more print job parameters that are mismatched if no match is found in the pre-defined dictionary; and
   updating, by the processor, the pre-defined dictionary to include the prose attribute entry for the one or more print job parameters that are mismatched.

7. The method of claim 1, wherein the processor is a natural language processor.

8. The method of claim 1, wherein the one or more print job parameters comprise at least one of: a quantity, a number of sides, a page count, a finished size, a paper weight, a paper grade, a paper finish, a color, a finishing or a type of packaging.

9. A non-transitory computer-readable medium storing a plurality of instructions which, when executed by a processor, cause the processor to perform operations for updating a prose attribute entry based upon one or more print job parameters of a print job order, the operations comprising:
   detecting a mismatch between the one or more print job parameters of the print job order and a prose attribute field of a print job request, wherein the mismatch is caused by a manual change to one of the one or more print job parameters of the print job order that was automatically populated from the prose attribute entry in the prose attribute field;
   presenting an option to update the prose attribute entry in the prose attribute field corresponding to the one or more print job parameters of the print job order that are mismatched;
   receiving a confirmation to update the prose attribute entry in the prose attribute field; and
   updating the prose attribute entry to include the one or more print job parameters that were mismatched, wherein the updating comprises identifying the prose attribute entry from a pre-defined dictionary of print job terms.

10. The non-transitory computer-readable medium of claim 9, wherein the detecting comprises:
    detecting a change to the one or more print job parameters of the print job order;
    comparing the change to the one or more print job parameters of the print job order to a corresponding prose attribute entry in the prose attribute field of print job request; and
    detecting the mismatch if the change to the one or more print job parameters of the print job order and a print job parameter associated with the corresponding prose attribute entry are different.

11. The non-transitory computer-readable medium of claim 9, further comprising:
    identifying, by the processor, from the print job request the one or more print job parameters in the prose attribute field; and
    storing, by the processor, the prose attribute entry that corresponds to each one of the one or more print job parameters and a location of the prose attribute entry in the prose attribute field.

12. The non-transitory computer-readable medium of claim 9, wherein the updating further comprises adding a new prose attribute entry.

13. The non-transitory computer-readable medium of claim 9, wherein the identifying comprises matching the one or more print job parameters that are mismatched to a corresponding print job parameter in the pre-defined dictionary and an associated prose attribute entry in the pre-defined dictionary.

14. The non-transitory computer-readable medium of claim 9, further comprising:
prompting a user to provide the prose attribute entry for the one or more print job parameters that are mismatched if no match is found in the pre-defined dictionary; and
updating the pre-defined dictionary to include the prose attribute entry for the one or more print job parameters that are mismatched.

15. The non-transitory computer-readable medium of claim 9, wherein the processor is a natural language processor.

16. The non-transitory computer-readable medium of claim 9, wherein the one or more print job parameters comprise at least one of: a quantity, a number of sides, a page count, a finished size, a paper weight, a paper grade, a paper finish, a color, a finishing or a type of packaging.

17. A method for updating a prose attribute entry based upon one or more print job parameters of a print job order, comprising:
receiving, by a processor, a print job request comprising a prose attribute field that comprises one or more prose attribute entries, wherein the print job request is received from a web based application;
analyzing, by the processor, the one or more prose attribute entries to identify one or more print job parameters as data for the print job order, wherein the analyzing comprises analyzing the one or more prose attribute entries to identify a particular form that matches a corresponding print job parameter in a pre-defined dictionary;
identifying, by the processor, one or more fields in the print job order that correspond to the one or more print job parameters;
populating, by the processor, the one or more fields with the data obtained from the one or more prose attribute entries;
detecting, by the processor, a mismatch between the one or more print job parameters entered in the one or more fields of the print job order and a corresponding one or more job parameters associated with the one or more prose attribute entries of the print attribute field of the print job request, wherein the mismatch is caused by a manual change to one of the one or more print job parameters of the print job order that was automatically populated from the one or more prose attribute entries in the prose attribute field;
presenting, by the processor, an option to update the one or more prose attribute entries in the prose attribute field that are mismatched to the one or more job parameters in the print job order;
receiving, by the processor, a confirmation to update the one or more prose attribute entries in the prose attribute field; and
updating, by the processor, the one or more prose attribute entries to include the one or more print job parameters entered in the one or more fields that are mismatched, wherein the updating comprises identifying the one or more prose attribute entries from a pre-defined dictionary of print job terms.

18. The method of claim 17, wherein the updating further comprises adding a new prose attribute entry.

* * * * *